Aug. 12, 1941.   D. GORDON   2,252,175
SMOKING PIPE CLEANING DEVICE
Filed Aug. 3, 1939

INVENTOR
Donald Gordon,
BY
Walter P. Guyer
ATTORNEY

Patented Aug. 12, 1941

2,252,175

UNITED STATES PATENT OFFICE 2,252,175

SMOKING PIPE CLEANING DEVICE

Donald Gordon, New York, N. Y.

Application August 3, 1939, Serial No. 288,192

8 Claims. (Cl. 131—232)

This invention relates to a smokers' article but more particularly to a device for cleaning the bowl of smoking pipes.

It has for one of its objects to provide a device of this character which will effectually and efficiently clean the cake from the pipe-bowl and also prevent the dust or scrapings from escaping into the atmosphere during cleaning, as well as prevent the escape of odors therefrom when the device is not in use.

Another object of the invention is to provide an electrically operated pipe-cleaning device for domestic use which is so designed that its component parts may be readily taken apart with a minimum of effort to dump its contents or scrapings from time to time.

A still further object of the invention is to provide a smokers' article which is simple, compact and inexpensive in construction and which is not liable to get out of order.

Other features of the invention reside in the construction and arrangement of parts hereinafter described and particularly pointed out in the appended claims.

Figure 1:
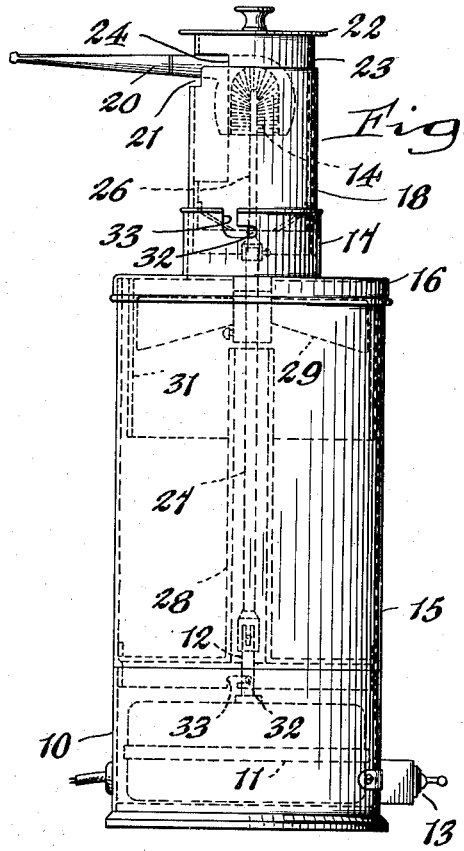
Figure 2:
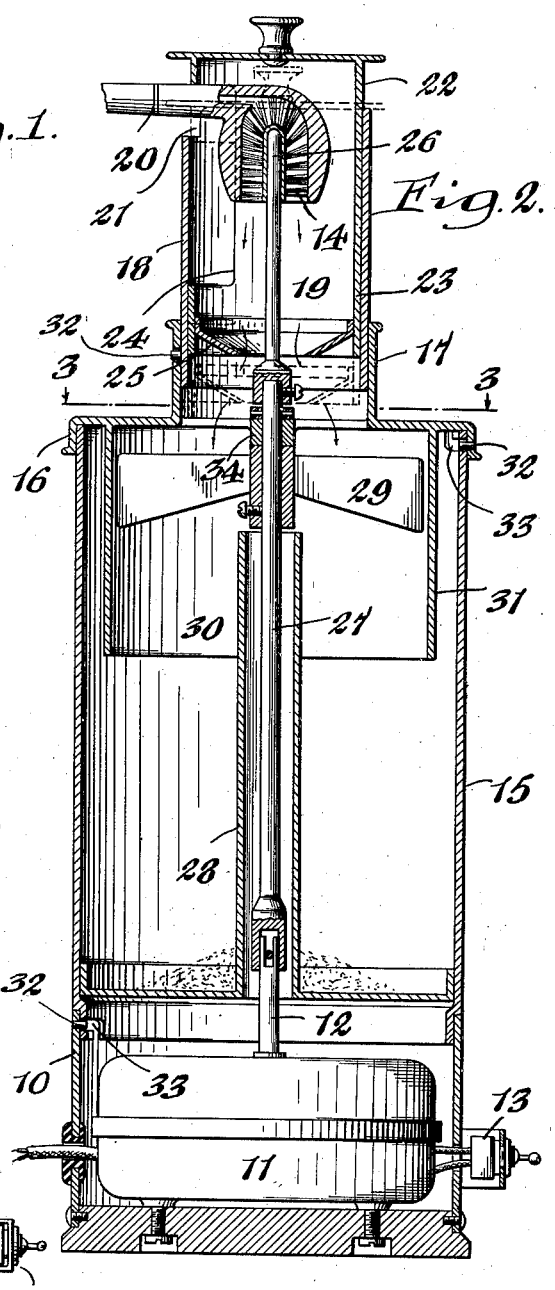
Figure 3:
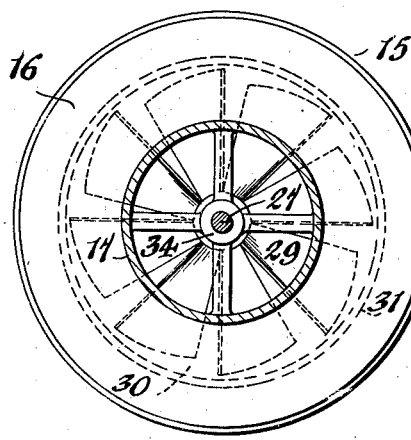

In the accompanying drawing:

Figure 1 is an elevational view of the pipe-cleaning apparatus embodying my invention. Figure 2 is an enlarged vertical section thereof. Figure 3 is a horizontal section taken in the plane of line 3—3, Figure 2.

Similar characters of reference indicate corresponding parts throughout the several views.

It is well known that upon constant usage of a smoking pipe the bowl thereof will become crusted or caked to such an extent that cleaning of the bowl is necessary. To this end, I have designed a pipe cleaner for home or domestic use and one which is portable and electrically operated in a manner similar to other electric household appliances.

Referring now to the drawing, wherein a preferred embodiment of my invention is shown, 10 indicates a hollow base in which is housed an electric motor 11 having a drive shaft 12 and a controlling switch 13, the motor serving to operate the cleaning element 14 of the device. Rising from this base and detachably connected thereto in any well-known manner is an ash receiver 15 of substantially cylindrical form which is closed at its lower end and provided at its upper end with a detachable closure or cover 16 having a neck 17 extending upwardly therefrom. Detachably connected to this neck is a sleeve 18 forming a chamber 19 into which the bowl of the pipe 20 is adapted to be inserted for cleaning purposes in an inverted position in the manner shown in Figures 1 and 2, and whose upper end is provided with a radial notch 21 with which the pipe-stem is adapted to engage for supporting and resisting turning of the pipe during cleaning. The bowl-receiving chamber 19 opens at its lower end through the cover-neck 17 into the ash-receiver 15 and telescopically fitted within the sleeve 18 is an axially-adjustable cover 22 whose skirt 23 has a bowl-receiving opening 24 in the side wall thereof for registration with the sleeve-notch 21 in the elevated position of such cover, as shown by full lines in Figure 2. In the closed position of the adjustable cover, shown by dotted lines in Figure 2, the sleeve-notch 21 is closed by the upper portion of the cover-skirt 23, so as to seal the device against the escape of the obnoxious odors emitted from the pipe-scrapings deposited into the receiver 15. At its lower or open end, the cover 22 may be provided with an inverted, substantially frusto-conical deflector 25 for directing the removed ash or scrapings toward the center of the mouth of the receiver.

The cleaning element 14 is preferably in the form of a rotatable wire brush or the like applied to a spindle 26 detachably connected at its lower end to the upper end of a driven shaft 27 journaled in and extending axially through the receiver 15 and detachably coupled in any approved manner to the motor-shaft 12, as shown in Figure 2. Rising from the bottom of the receiver and encasing the shaft 27 is a tube 28. At its upper end this shaft is provided with a suction-creating fan 29 which operates in a wind-tunnel or compartment 30 disposed at the upper end of the ash-receiver and preferably formed by an annular collar 31 depending from the cover 16, whereby the scrapings cleaned from the pipe-bowl by the rotating brush 14 are directed by a down-draft into the receiver.

The various component parts of this apparatus, as before stated, are detachably connected to one another to facilitate access thereto when desired, or for dumping the contents of the receiver 15, and for this purpose the connection between the latter and the motor-base 10, as well as the connections between the receiver and the cover 16 and between the latter and the sleeve 18 may be in the form of a bayonet or like joint, such joint including the complementary pin and slot elements 32 and 33, respectively.

In use, the cover 22 is elevated sufficiently to insert the pipe-bowl into the chamber 19 and over the cleaning brush 14, after which the cover is lowered as far as possible and the motor 11 started to operate the brush and the fan 29. As the bowl-cake is removed, the ashes or scrapings are drawn downwardly by the suction of the fan into the ash receiver 15. In this connection, the latter is vented through the coupling fittings 31, 32 and the air circulates downwardly through the receiver, through the tube 28, and thence into the motor chamber and out through the wire-receiving openings in the base 10.

By preference, the upper end of the shaft 27 is supported in a bearing 34 connected by radial arms with the cover 16, as shown in Figures 2 and 3, such bearing centering the shaft during rotation and functioning as a thrust bearing to normally maintain the shaft in coupled driving engagement with the motor-shaft 12. When the cover is removed, the shaft 27 is lifted with it, together with the brush-spindle 26, from coupling engagement with the motor-shaft, whereby these parts remain in their relatively assembled position when detached from the receiver 15 and leave the latter completely open at its upper end for the convenient emptying of its contents.

I claim as my invention:

1. A smoking pipe cleaning device, comprising an ash receiver having a chamber rising therefrom in communication therewith and into which the bowl of a pipe is adapted to be inserted, a closure member applied to said bowl-receiving chamber for movement relative thereto and having an opening therein for the introduction of the pipe bowl to and from such chamber, a revolvable cleaning element extending into said chamber for engagement with the pipe bowl, and a suction creating means interposed between the receiver and the adjoining end of the pipe bowl chamber.

2. A smoking pipe cleaning device, comprising a base for housing an electric motor, an ash receiver rising from said base and having a superposed chamber in communication therewith and into which the bowl of a pipe is adapted to be inserted, a drive shaft connected to said motor and extending upwardly through said receiver and terminating at its upper end in said chamber below the top thereof, a cleaning element applied to the upper end of said shaft for engagement with the pipe bowl, and a suction creating fan applied to said shaft between the communicating portions of said ash receiver and said chamber.

3. A smoking pipe cleaning device, comprising an ash receiver having a chamber communicating therewith and into which the bowl of a pipe is adapted to be inserted, a revolvable cleaning element extending into said chamber for engagement with the pipe bowl, means interposed between said receiver and the pipe bowl chamber for creating a down-draft to direct the bowl-scrapings into the receiver, and a cover applied to said bowl-chamber and axially adjustable relatively thereto, said cover having an opening therein for the introduction and removal of the pipe bowl to and from said chamber.

4. A smoking pipe cleaning device, comprising an ash receiver having a substantially cylindrical chamber communicating therewith and into which the bowl of a pipe is adapted to be inserted, a revolvable cleaning element disposed axially of said chamber for engagement with the pipe bowl, means interposed between said receiver and the pipe bowl chamber for creating a down-draft to direct the bowl scrapings into the receiver, and a cover applied to the bowl chamber and axially adjustable relatively thereto, said cover including a top and a depending skirt telescopically engaging said chamber for adjustment to variable elevations and having an opening therein for the introduction and removal of the pipe bowl to and from said chamber, said opening being concealed by the chamber wall in the lowered position of the cover.

5. A smoking pipe cleaning device, comprising an ash receiver having a substantially cylindrical chamber communicating therewith and into which the bowl of a pipe is adapted to be inserted, a revolvable cleaning element disposed axially of said chamber for engagement with the pipe bowl, means interposed between said receiver and the pipe bowl chamber for creating a down-draft to direct the bowl-scrapings into the receiver, and a cover applied to the bowl chamber and axially adjustable relatively thereto, said cover having an opening therein for the introduction and removal of the pipe bowl to and from said chamber and an internal deflector wall adjacent its lower end for directing the bowl scrapings into said receiver.

6. A smoking pipe cleaning device, comprising an ash receiver having a chamber rising therefrom in communication therewith and into which the bowl of a pipe is adapted to be inserted, a revolvable cleaning element extending into said chamber for engagement with the pipe bowl, a suction creating fan interposed between the receiver and the adjoining end of the pipe bowl chamber, and a wall disposed concentrically within the upper end of said receiver about said suction fan.

7. A smoking pipe cleaning device, comprising a base for housing an electric motor, an ash receiver rising from said base, a pipe bowl enclosure rising from said receiver in open communication therewith and having an opening therein for the insertion of the bowl of a pipe in an inverted position, a shaft detachably coupled to said motor and extending upwardly thru the ash receiver into said bowl enclosure, a cleaning element applied to the upper end of said shaft for engagement with the pipe bowl, a suction fan applied to said shaft between the communicating ends of said receiver and said bowl enclosure, and complementary means between the upper and lower ends of the ash receiver and the opposing ends of said bowl enclosure and said base, respectively, for detachably connecting such parts one to another as a unit.

8. A smoking pipe cleaning device, comprising a base containing an electric motor, an ash receiver rising therefrom and open at its upper end, a cover detachably connected to the open end of said receiver and including a shaft bearing and a chamber opening into the receiver and into which the bowl of a pipe is adapted to be inserted, a shaft extending through the receiver and detachably coupled at its lower end to said motor and journaled at its upper end in said cover bearing, and a cleaning element applied to the upper end of said shaft for engagement with the pipe bowl, said shaft constituting a unitary part of the cover for removal therewith when detaching it from the receiver.

DONALD GORDON.